United States Patent
Wagner et al.

(10) Patent No.: US 11,698,266 B2
(45) Date of Patent: Jul. 11, 2023

(54) DISPLAYING MANEUVERING INSTRUCTIONS ALONG A ROUTE

(71) Applicant: Bayerische Motoren Werke Aktiengesellschaft, Munich (DE)

(72) Inventors: Vanessa Wagner, Munich (DE); Edna Platzer, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 123 days.

(21) Appl. No.: 15/356,757

(22) Filed: Nov. 21, 2016

(65) Prior Publication Data

US 2017/0067752 A1 Mar. 9, 2017

Related U.S. Application Data

(63) Continuation of application No. PCT/EP2015/061233, filed on May 21, 2015.

(30) Foreign Application Priority Data

May 22, 2014 (DE) ..................... 10 2014 209 751.7

(51) Int. Cl.
*G01C 21/36* (2006.01)
*B60R 1/00* (2022.01)
*B60K 35/00* (2006.01)

(52) U.S. Cl.
CPC ............ *G01C 21/3667* (2013.01); *B60R 1/00* (2013.01); *G01C 21/3623* (2013.01);
(Continued)

(58) Field of Classification Search
CPC .. B60R 1/00; G01C 21/3623; G01C 21/3632; G01C 21/3655; G01C 21/3658; G01C 21/3673
(Continued)

(56) References Cited

U.S. PATENT DOCUMENTS 6,269,304 B1 7/2001 Kaji et al.
2001/0027377 A1 10/2001 Shimabara
(Continued)

FOREIGN PATENT DOCUMENTS

DE 100 09 850 A1 10/2000
DE 10 2007 038 463 A1 12/2008
(Continued)

OTHER PUBLICATIONS

International Search Report (PCT/ISA/210) issued in PCT Application No. PCT/EP2015/061233 dated Nov. 12, 2015 with English translation (Ten (10) pages).
(Continued)

*Primary Examiner* — Maceeh Anwari
(74) *Attorney, Agent, or Firm* — Crowell & Moring LLP

(57) ABSTRACT

A method is provided for a navigation device to display maneuvering instructions along a route, involving: displaying a digital map in a perspective manner on a display unit of the navigation device; according to the distance of the navigation device from the location of the maneuver, i.e. the location where a maneuver is to be carried out as per the route: displaying first maneuvering instructions for the maneuver when the navigation device is farther from the location of the maneuver than a predefined distance; displaying second maneuvering instructions instead of the first maneuvering instructions for the maneuver when the navigation device is closer to the location of the maneuver than the predefined distance; the first and second maneuvering instructions being displayed in such a way as to cover up a portion of the displayed digital map; displaying a graphic link between the location of the maneuver on the digital map and the first or second maneuvering instructions.

12 Claims, 3 Drawing Sheets

(52) U.S. Cl.
CPC ..... *G01C 21/3632* (2013.01); *G01C 21/3655* (2013.01); *G01C 21/3658* (2013.01); *G01C 21/3673* (2013.01); *B60K 35/00* (2013.01); *B60K 2370/186* (2019.05); *B60R 2300/804* (2013.01)

(58) Field of Classification Search
USPC ........................................................ 701/431
See application file for complete search history.

(56) References Cited

U.S. PATENT DOCUMENTS

| | | | |
|---|---|---|---|
| 2003/0050756 A1 | 3/2003 | McGovern | |
| 2007/0106470 A1 | 5/2007 | Nakayama et al. | |
| 2008/0312827 A1 | 12/2008 | Kahlow et al. | |
| 2009/0187335 A1 | 7/2009 | Muhlfelder et al. | |
| 2009/0222202 A1 | 9/2009 | Kato | |
| 2012/0123672 A1 | 5/2012 | Kojima et al. | |
| 2012/0268351 A1* | 10/2012 | Sasaki | G01C 21/365 345/8 |
| 2013/0191020 A1 | 7/2013 | Emani et al. | |
| 2013/0194109 A1 | 8/2013 | Clark et al. | |
| 2013/0326384 A1* | 12/2013 | Moore | G01C 21/3638 715/771 |
| 2014/0365122 A1* | 12/2014 | McGavran | G01C 21/3632 701/533 |

FOREIGN PATENT DOCUMENTS

| | | |
|---|---|---|
| DE | 10 2008 025 053 A1 | 7/2009 |
| DE | 10 2011 013 855 A1 | 9/2012 |
| DE | 102011013855 A1 * | 9/2012 |
| DE | 10 2012 213 307 A1 | 1/2014 |
| EP | 0 767 448 A1 | 4/1997 |
| EP | 1 942 314 A1 | 7/2008 |
| EP | 2 775 262 A1 | 9/2014 |
| WO | WO 2007/077829 A1 | 7/2007 |
| WO | WO2007/077829 A1 * | 7/2007 |

OTHER PUBLICATIONS

German-language Written Opinion (PCT/ISA/237) issued in PCT Application No. PCT/EP2015/061233 dated Nov. 12, 2015 (Fourteen (14) pages).

German-language Search Report issued in counterpart German Application No. 10 2014 209 751.7 dated Dec. 12, 2014 with partial English translation (Thirteen (13) pages).

Chinese Rejection Decision issued in Chinese application No. 201580027100.6 dated Dec. 30, 2019 (Five (5) pages).

German-language European Notice of Allowance issued in European application No. 15 727 327.7-1003 dated Dec. 13, 2019 (Seven (7) pages).

* cited by examiner

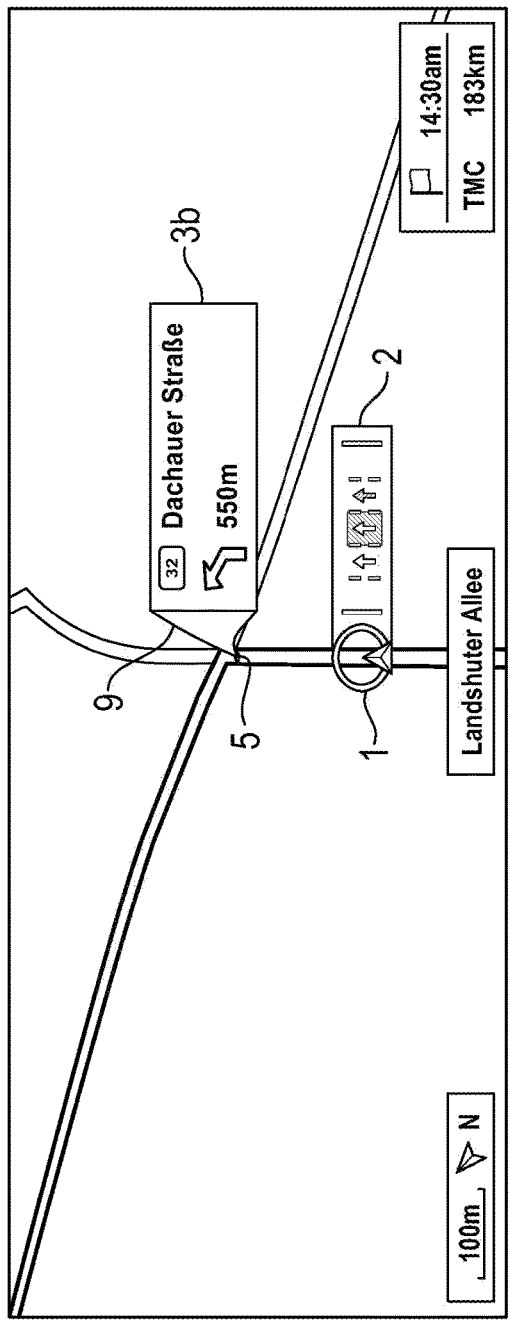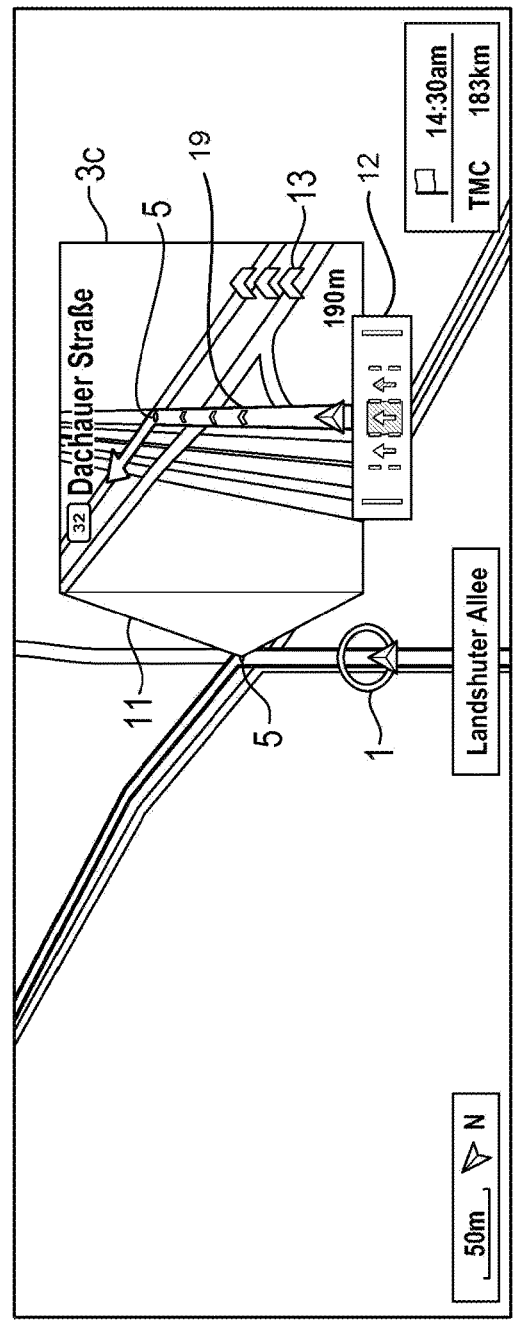

DISPLAYING MANEUVERING INSTRUCTIONS ALONG A ROUTE

CROSS REFERENCE TO RELATED APPLICATIONS

This application is a continuation of PCT International Application No. PCT/EP2015/061233, filed May 21, 2015, which claims priority under 35 U.S.C. § 119 from German Patent Application No. 10 2014 209 751.7, filed May 22, 2014, the entire disclosures of which are herein expressly incorporated by reference.

BACKGROUND AND SUMMARY OF THE INVENTION

The invention relates to a method for displaying maneuvering instructions by way of a navigation device for a route, and to a corresponding navigation device.

Nowadays, navigation devices, in particular for motor vehicles, are widespread. These devices determine their position (and therefore also the position of the vehicle which contains the navigation device) in a satellite-assisted fashion by means of GPS, GLONASS and/or Galileo. The navigation devices can calculate a route to a predefined destination starting from this position, and output instructions for the next maneuver which is to be carried out. Typically, this output includes a pictogram, for example an arrow, which symbolizes the maneuver to be carried out. The distance up to the next maneuver to be carried out is frequently also specified.

US 2013191020 A1 discloses a navigation device which during operation displays a digital map and indicates the next driving maneuver on this digital map by means of an arrow which is located on the route. A disadvantage of this is that this type of representation in a perspective view of the map is suitable essentially only for maneuvers at a short distance. At a short distance, the arrows can be displayed on the route in such a way that they can be differentiated sufficiently. This representation is unsuitable for a maneuver at a relatively large distance, since the ability to recognize the arrow decreases in a perspective view, as is indicated in the document.

The present invention is based on the object of displaying to the user of a route planning system the maneuvers which are to be carried out and the associated location of the maneuver in perspective map views in such a way that they can be recognized even for maneuvers which are further away.

This and other objects are achieved in accordance with embodiments of the invention.

One aspect of the invention relates to a method for displaying maneuvering instructions by a navigation device for a route. The method comprises: displaying a digital map in a perspective fashion on a display of the navigation device; depending on the distance of the navigation device from the location of the maneuver, specifically the location at which a driving maneuver is to be carried out in accordance with the route: displaying a first maneuvering instruction for the driving maneuver if the navigation device is further from the location of the maneuver than a predetermined distance; displaying a second maneuvering instruction instead of the first maneuvering instruction for the driving maneuver if the navigation device is closer to the location of the maneuver than the predetermined distance; wherein the first and the second maneuvering instructions are each displayed in such a way that they each cover part of the displayed digital map (but, in particular, do not cover the route); displaying in each case a graphic link between the location of the maneuver on the digital map and the first or second maneuvering instruction.

The perspective display is sometimes also referred to as 2.5-D display and frequently includes making an artificial horizon visible on the display, and the digital map is distorted (compressed) toward the horizon. Compared to a 2-D display, the scale of the representation of the map therefore changes as a function of the location on the display. The method can also be carried out with a display of the digital map in a 2-dimensional fashion (2-D), and furthermore, in particular, in a travel-indicating fashion (that is to say configured in such a way that the representation of the vehicle always travels in one direction, in particular perpendicularly with respect to the upper edge of the display) or in a fashion which points north (that is to say in such a way that the map is always displayed with a northerly orientation). The first and second maneuvering instructions both relate to the same driving maneuver.

It is therefore provided here to display the maneuvering instruction separately from the location of the maneuver, that is to say spaced apart from it. However, at the same time the relationship of the maneuvering instruction to the location of the maneuver is illustrated graphically to the user on the map.

This type of display provides the advantage compared to integrating the maneuvering instruction into the route as in the prior art that the maneuvering instruction does not have to be represented in a perspective fashion but instead can be displayed without distortion and with a sufficient size. Therefore, even maneuvering instructions at a relatively large distance can be clearly recognized by the user in a perspective view of the map. This permits the user to take in quickly the information relating to future driving maneuvers, which reduces the distraction from the road traffic and contributes to road safety. Furthermore, representing the maneuvering instruction separately from the route permits additional information to be presented above and beyond the maneuvering arrow, for example the distance up to the maneuver.

In addition, it is provided to change the maneuvering instruction as soon as the position of the navigation device (that is to say of the vehicle or user) is closer than a predefined distance to the maneuvering point. The distance can be measured along the route. In this way, the information necessary for the driving maneuver can be issued to the user at the times at which the user requires the information. If the user is, for example, still comparatively far away from a location of a maneuver, the specification where the location of a maneuver is located and which maneuver is to be carried out is sufficient. As soon as the user has approached to a predetermined distance (for example 50 m, 100 m or 500 m), the information which is necessary or helpful for the driving maneuver to be carried out is presented to him. In this way, the driver is not distracted from the events on the road by unnecessary information at a relatively large distance from the maneuvering point, which increases road safety.

In one embodiment, the first and the second maneuvering instructions are essentially rectangular, and the respective graphic link is configured in the shape of a funnel and adjoins a large part of one side of the respective maneuvering instruction. The relationship of the maneuvering instruction to the location of the maneuver is therefore illustrated by way of graphic elements. This is done most simply by use of a connecting line or, as proposed here, by use of a funnel.

As already explained, the first and second maneuvering instructions can each comprise an arrow which represents the driving maneuver to be carried out. In addition, the first and second maneuvering instructions can respectively also indicate the distance between the navigation device and the location of the maneuver. Likewise, the second maneuvering instruction can also additionally indicate the designation of the road which is to be reached using the maneuver.

In one preferred development, the method also serves to output a lane recommendation. The method includes for this purpose: depending on the distance of the navigation device from a location of a lane recommendation, specifically the location for which a lane recommendation on the route is provided: displaying a first lane instruction for the lane recommendation if the navigation device is located ahead of the location of the lane recommendation in the direction of movement; displaying a second lane instruction instead of the first lane instruction if the navigation device is located after the location of the lane recommendation in the direction of movement (wherein the second lane instruction carries the same information as the first lane instruction); wherein the first and the second lane instructions are each displayed in such a way that they each cover part of the displayed digital map (but, in particular, not the route); displaying a graphic link between the first lane instruction on the digital map and the position of the lane recommendation; wherein the second lane instruction is displayed in such a way that it moves along with the marking of the current position of the navigation device on the digital map; in particular, the second lane instruction is displayed in such a way that it is represented adjacent to the marking of the current position. The first and second lane instructions relate to the same lane recommendation. In an expansion of this embodiment, the first and second lane instructions not only respectively include one or more lane recommendations but also one or more lanes which are possible on the basis of the navigation route. If appropriate, these possible lanes are delimited with respect to the recommended lane or lanes by way of a slightly modified graphic representation.

According to this embodiment, a lane recommendation is output in addition to maneuvering instructions. This is helpful to the user in particular if different lanes are assigned different directions of travel. It is therefore possible, for example, for a lane which is furthest on the left to have a compulsory requirement that the road user turns off to the left. The lane recommendation is determined in accordance with the next driving maneuver to be carried out (on the basis of data relating to lanes on the digital map of the navigation device). The lane recommendation is output in two ways, depending on the distance of the user from the location of the lane recommendation. The first and second lane instructions can be in the same form and merely be arranged differently. The first lane instruction is displayed in a similar way to the maneuvering instructions next to the location of the lane recommendation (that is to say in any case not covering the route). In the same way as the maneuvering instructions, the lane instruction is linked to the location of the lane recommendation by way of a graphic element (line, funnel), and symbolizes a local relationship to the driver and informs the driver in advance about imminent lane recommendations and necessary lane changes. After the location of the lane recommendation has been passed, the second lane recommendation, and likewise the marking of the current position on the map, moves. The second lane instruction therefore moves along with the user. In contrast to a driving maneuver, a lane change can usually be carried out over a certain distance and therefore does not have to be carried out at one point. The moving along of the lane instruction illustrates to the user that the lane change task is due and has to be carried out, or it must at least be checked whether the current lane of the user is correct. In this way, the user can intuitively ascertain which driving tasks are to be carried out.

In one particular embodiment, the method includes: determining the lane in which the navigation device (and the vehicle containing the navigation device) is located, using a camera system; wherein the first and second lane instructions each comprise an indication of the determined lane. The camera system is typically directed onto the roadway lying ahead of the vehicle and detects the hard shoulder and the central reservation and, where appropriate, direction arrows on the individual lanes. Based on this information it is possible to infer which lane the vehicle is located on. The indication of the current lane serves as a reference and as an additional orientation aid to the user (and driver).

In one advantageous embodiment, the method also includes: displaying a predetermined number of equally spaced-apart distance markings on a representation of the route starting from the location of the maneuver in the direction of the current position of the navigation device; wherein each distance marking is assigned a distance from the location of the maneuver; displaying the same number of status markings; wherein each status marking is assigned a distance marking on the representation of the route; wherein the respective status marking changes its appearance if the current position of the navigation device is closer to the location of the maneuver than the distance assigned to the corresponding distance marking or the navigation device passes the respective distance.

The distance markings are typically graphic elements which are displayed on the route. They are arranged at the respective same distance (for example 50 m, 100 m or 500 m) and a (the first) distance marking is also offset from the location of the maneuver by this distance. Each distance marking is assigned a distance from the location of the maneuver. The distance markings are arranged ahead of the location of the maneuver in the direction of travel (also referred to as the direction of movement herein). At the same time, the user is provided with an indication, which is easy to take in graphically, as to what portion of the distance markings he has already passed, and therefore the distance between him and the next location of a maneuver. For this purpose, the same number of status markings is made available, said number being displayed fully independently of the map and the location of the maneuver or the distance markings. These status markings are advantageously arranged in such a way that the number of the status markings which have changed their appearance can easily be taken in compared to the overall number. Typically, the status markings are arranged in a row. If the position of the navigation device is closer than a distance assigned to the distance marking, the corresponding status marking changes its appearance (and retains the changed appearance until the ending of the display of the status markings). A change in appearance can include a change of color or the filling in of a previously unfilled shape of the status marking. In this way, one status marking after the other changes its appearance in accordance with the approaching of the user to the location of the maneuver. This provides the user with an intuitively recognizable instruction as to when a driving maneuver is to be carried out and reduces the probability of incorrect execution of the maneuver.

Another aspect of the invention relates to a navigation device having a display unit for displaying maneuvering instructions for a route, wherein the navigation device includes a processor and memory and is configured to carry out one of the above methods. Likewise, a further aspect relates to a vehicle (in particular a passenger car) with such a navigation device.

Other objects, advantages and novel features of the present invention will become apparent from the following detailed description of one or more preferred embodiments when considered in conjunction with the accompanying drawings.

BRIEF DESCRIPTION OF THE DRAWINGS

FIGS. 1 to 4 are a sequence of schematic views of the display unit of a navigation device during the approach to a location of a maneuver according to an exemplary embodiment.

The same reference symbols relate to corresponding elements in all the figures.

DETAILED DESCRIPTION OF THE DRAWINGS

FIGS. 1 to 4 show schematic views of the display unit of a navigation device during the approach to a location of a maneuver according to an exemplary embodiment. Here, a navigation device navigates a vehicle on a route 10. The display unit of the navigation device displays a digital map with roads, wherein the vehicle is navigated on the route 10 (bolded) by the navigation device. Maneuvering instructions and lane recommendations are output for this route 10. The position of the vehicle is marked on the digital map by a position marking 1, and the direction of travel is indicated by the arrow of the position marking 1.

Figure 1:
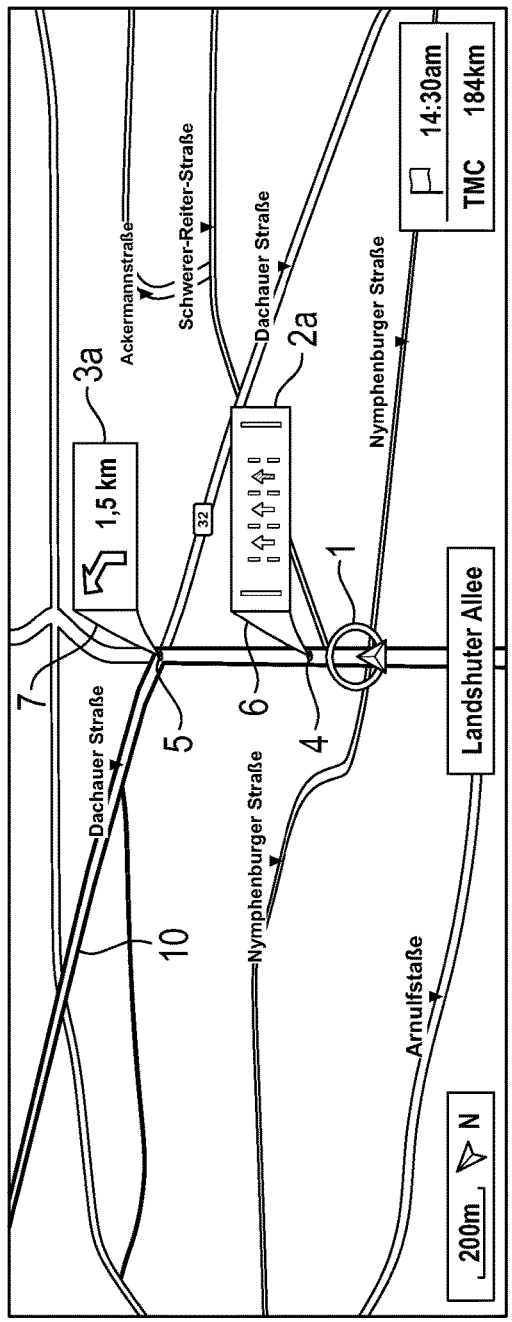

In FIG. 1, the vehicle is located before, in the direction of travel, the location 4 of the lane recommendation (the location 4 is ahead of the vehicle), to which location a lane recommendation is assigned. The roadway has five lanes at the location 4, extending in a direction of travel which is indicated symbolically in the lane instruction 2a. In the present example, the left-hand lane is assigned a turning off behavior to the left, the three middle lanes lead straight ahead and the right-hand lane is assigned a turning off behavior to the right. In the lane instruction 2a, those lanes to which a recommended or possible turning off behavior is assigned are represented with corresponding arrows. The recommendation as to which lane or lanes should be traveled on by the vehicle is effected by highlighting the recommended lanes, here for example by highlighting (in white) the direction arrows of the two left-hand lanes for straight-ahead travel (lanes No. 2 and No. 3 when counting from the left). The possible right-hand straight-ahead lane (lane No. 4 when counting from the left), which is, however, not recommended and not ideal in terms of the next driving maneuver, is displayed in gray (dashed lines in FIG. 2) to the driver. Furthermore, there can be provision (not shown in FIG. 2) for arrows for the turning off behavior of the lanes Nos. 1 and 5 (when counting from the left) which are not possible to be displayed generally to the driver for the purpose of orientation (if appropriate with less graphic highlighting than lane No. 4).

The lane instruction 2a is displayed by superimposition on the map in the vicinity of the location 4 of the lane recommendation, but not in such a way that it is superimposed on the route. The lane instruction 2a is assigned optically to the location 4 of the lane recommendation by way of a graphic link, specifically a funnel 6. This graphic link indicates to the driver of the vehicle the location for which a lane recommendation is issued by the lane instruction 2a.

Furthermore, the vehicle is located before, in the direction of travel, the location 5 of the maneuver at which the vehicle is to carry out a turning off maneuver. The future maneuver is displayed by use of a maneuvering instruction 3 which both describes the maneuver (turn off to the left) and indicates the current distance from the maneuvering point (measured along the route). The maneuvering instruction 3 also covers the map but not the route and is linked to the location 5 of the maneuver via a graphic link (the funnel 7). The fact that the maneuver is to be carried out at the location 5 is therefore indicated symbolically to the driver.

Figure 2:
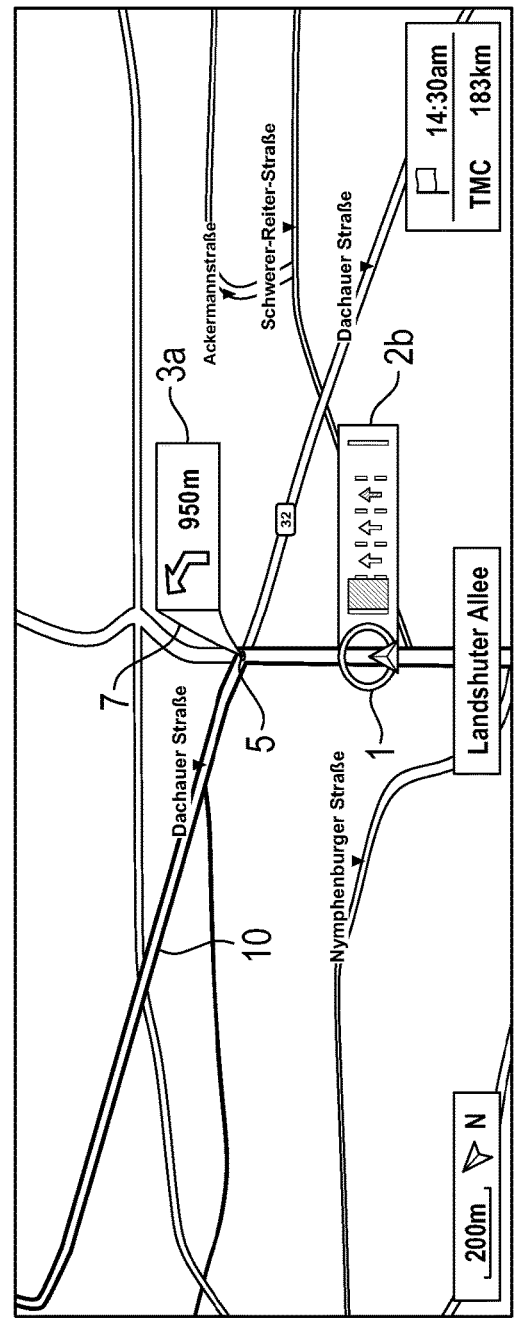

In FIG. 2, the vehicle has passed the location 4 of the lane recommendation (FIG. 1) but is still located before the location 5 of the maneuver. At the moment when the location of the lane recommendation is passed, the first lane marking 2a (FIG. 1) has changed into the second lane marking 2b and has been graphically adjoined to the position marking 1 (represented by the adaptation of the lane instruction to the rounding of the position marking 1). The lane marking 2b moves along in accordance with the movement of the position marking 1 and remains adjoined thereto.

In the exemplary embodiment in FIGS. 1 to 4, the vehicle has a camera system which is used to detect the lane on which the vehicle is located. The lane on which the vehicle is located is displayed by hatching in the lane marking 2b. Alternative representations of the lane on which the vehicle is located are also possible.

FIG. 3 shows a schematic view such as is represented when the vehicle further approaches the maneuvering point 5. In FIG. 3, the vehicle is less than a predetermined distance from the maneuvering point 5. When the vehicle is closer than the predetermined distance, the first maneuvering instruction 3a (FIGS. 1 and 2) is converted into a second maneuvering instruction 3b. The latter then comprises, in addition to the indications of the first maneuvering instruction 3a (FIGS. 1 and 2), the indication of the road to which the driving maneuver should lead the vehicle. The second maneuvering instruction 3b is also linked to the location 5 of the maneuver via a graphic link (funnel 9).

FIG. 4 illustrates an optional expansion of the method according to the invention. When the vehicle further approaches to less than a second predefined distance, a third maneuvering instruction 3c is displayed, which provides details on the geometry of the road on which the driving maneuver is to be carried out. This third maneuvering instruction 3c is also linked to the location 5 of the maneuver via a graphic link 11. A third lane instruction 12, which points to the same lane recommendation as the second and the first lane instructions is adjoined to the instruction 3c at the lower edge.

Distance markings 19 and status markings 13 are also included in the maneuvering instruction 3c. Each distance marking is assigned a distance from the location 5 of the maneuver and a status marking. As soon as the position of the vehicle becomes closer than one of the assigned distances, the corresponding status marking is filled in in color. The assignment of distance markings 19 and status markings 13 is such that the status markings are filled in from below. This gives the driver a good impression, in the sense of a countdown, of when the driving maneuver is to be carried out.

Figure 5:
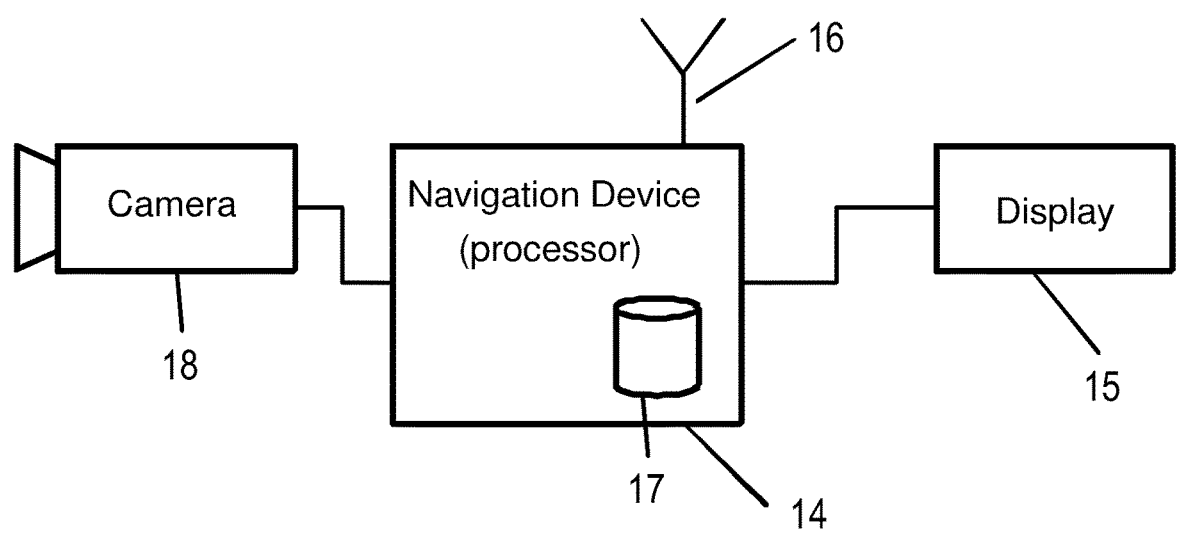
FIG. 5 is a schematic block diagram of the design of a navigation device.

FIG. 5 shows the schematic view of a navigation device according to an exemplary embodiment. The navigation device comprises an electronic computing unit 14, such as a processor and its associated memory, which is configured to carry out the method according to the invention using a computer program. The electronic computing unit 14 contains a database 17 which stores the digital map material. The computing unit 14 is connected to an LCD display 15 and to a camera system 18. Other types of displays such as OLED can generally also be used. By means of an antenna 16, the computing unit 14 receives signals from navigation satellites such as GPS or GLONASS satellites and uses said signals to determine its position on the ground. The navigation device is typically contained in a vehicle (not illustrated).

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A method for displaying maneuvering instructions via a navigation device for a route, the method comprising the acts of:
    displaying a digital map according to a perspective-view on a display of the navigation device, the digital map including a graphical depiction of the route and a maneuver-point on the graphical depiction of the route corresponding to a maneuver-location at which a driving maneuver is to be carried out in accordance with the route;
    displaying a first maneuvering instruction corresponding to the driving maneuver, in response to the navigation device is being further than a predetermined distance from the maneuver-location, wherein the first maneuvering instruction is displayed so as to cover part of the displayed map;
    graphically linking the maneuver-point on the digital map to the first maneuvering instruction;
    displaying a second maneuvering instruction visually converted from the first maneuvering instruction so as to maintain the graphical link and also corresponding to the driving maneuver, in response to the navigation device being closer than the predetermined distance to the maneuver-location, wherein the second maneuvering instruction is displayed so as to cover part of the displayed map; and
    displaying a lane recommendation so as to cover part of the displayed map without being superimposed over the route;
    wherein the graphical linking is via a respective graphic link that abuts the respective point at one end of the graphic link and the respective instruction at another end of the graphic link.

2. The method according to claim 1, wherein the first and second maneuvering instructions are essentially rectangular; and wherein the graphic link is in the shape of a funnel that adjoins a large part of one side of the respective maneuvering instruction.

3. The method according to claim 2, wherein the first and second maneuvering instructions each comprise an arrow representing the driving maneuver, and each indicate the distance between the navigation device and the maneuver-location.

4. The method according to claim 1, wherein the first and second maneuvering instructions each comprise an arrow representing the driving maneuver, and each indicate the distance between the navigation device and the maneuver-location.

5. The method according to claim 1, wherein the second maneuvering instruction also includes the name of the road which is to be reached using the driving maneuver.

6. The method according to claim 1, further comprising:
    displaying a first lane instruction corresponding to the lane-recommendation, in response to the navigation device being located before a lane-location at which the lane-recommendation is to be carried out, wherein the first lane instruction is displayed so as to cover part of the digital map without being superimposed over the route;
    graphically linking a second point on the digital map to the first lane instruction, wherein the second point corresponds to the lane-location;
    displaying a second lane instruction visually converted from the first lane instructions and also corresponding to the lane-recommendation, in response to the navigation device being located after the lane-location, wherein the second lane-instruction is displayed so as to cover part of the displayed digital map without being superimposed over the route and such that the second lane instruction moves along the route with a marker that indicates a current position of the navigation device.

7. The method according to claim 6, wherein the second lane instruction is displayed adjacent the marker.

8. The method according to claim 6, further comprising the act of:
    determining a lane in which the navigation device is located, using a camera system, wherein the first and the second lane instructions each comprise an indication of the determined lane.

9. The method according to claim 1, further comprising the acts of:
    displaying a predetermined number of equally spaced-apart distance markings on the graphical depiction of the route starting from the maneuver-location, wherein each distance marking is assigned a distance from the maneuver-location;
    displaying the same number of status markings, wherein each status marking is assigned a distance marking on the graphical depiction of the route, wherein the respective status marking changes its appearance if the current position of the navigation device is closer to the maneuver-location than the distance assigned to the corresponding distance marking.

10. The method according to claim 8, wherein the status markings are displayed in a row, and wherein successively displayed status markings are assigned successive distance markings.

11. A navigation device having a display unit for displaying maneuvering instructions for a route; wherein the navigation device includes a processor and associated memory configured to:
    display a digital map according to a perspective-view on the display unit, the digital map including a graphical depiction of the route and a maneuver-point on the graphical depiction of the route corresponding to a maneuver-location at which a driving maneuver is to be carried out in accordance with the route;
    display, on the display unit, a first maneuvering instruction corresponding to the driving maneuver, in response to if the navigation device being further than a predetermined distance from the maneuver-location, wherein the first maneuvering instruction is displayed so as to cover part of the displayed map;

graphically link the maneuver-point on the digital map to the first maneuvering instruction;

display a second maneuvering instruction visually converted from the first maneuvering instruction so as to maintain the graphical linking and also corresponding to the driving maneuver, in response to the navigation device being closer than the predetermined distance to the maneuver-location, wherein the second maneuvering instruction is displayed so as to cover part of the displayed map; and display a lane recommendation so as to cover part of the displayed map without being superimposed over the route;

wherein the graphical linking is via a respective graphic link that abuts the respective point at one end of the graphic link and the respective instruction at another end of the graphic link.

12. A vehicle, comprising a navigation device having a display unit for displaying maneuvering instructions for a route, wherein the navigation device includes a processor and associated memory configured to:

display a digital map according to a perspective-view on the display unit, the digital map including a graphical depiction of the route and a maneuver-point on the route corresponding to a maneuver-location at which a driving maneuver is to be carried out in accordance with the route;

display, on the display unit, a first maneuvering instruction corresponding to the driving maneuver, in response to the navigation device being further than a predetermined distance from the maneuver-location, wherein the first maneuvering instruction is displayed so as to cover part of the displayed map;

graphically link the maneuver-point on the digital map to the first maneuvering instruction;

display a second maneuvering instruction visually converted from the first maneuvering instruction so as to maintain the graphical linking and also corresponding to the driving maneuver, in response to the navigation device being closer than the predetermined distance to the maneuver-location, wherein the second maneuvering instruction is displayed so as to cover part of the displayed map; and display a lane recommendation so as to cover part of the displayed map without being superimposed over the route, wherein the graphical linking is via a respective graphic link that abuts the respective point at one end of the graphic link and the respective instruction at another end of the graphic link.

\* \* \* \* \*